US012567619B2

(12) United States Patent
Zhang

(10) Patent No.: US 12,567,619 B2
(45) Date of Patent: Mar. 3, 2026

(54) TRACTION BATTERY PACK HAVING BATTERY CELL HOLDERS THAT GUIDE COOLANT

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 643 days.

(21) Appl. No.: 18/067,851

(22) Filed: Dec. 19, 2022

(65) Prior Publication Data

US 2024/0204293 A1     Jun. 20, 2024

(51) Int. Cl.
| | |
|---|---|
| *H01M 10/6557* | (2014.01) |
| *H01M 10/613* | (2014.01) |
| *H01M 10/625* | (2014.01) |
| *H01M 10/647* | (2014.01) |
| *H01M 10/6556* | (2014.01) |
| *H01M 10/6568* | (2014.01) |
| *H01M 50/209* | (2021.01) |
| *H01M 50/224* | (2021.01) |
| *H01M 50/249* | (2021.01) |

(52) U.S. Cl.
CPC ..... *H01M 10/6557* (2015.04); *H01M 10/613* (2015.04); *H01M 10/625* (2015.04); *H01M 10/647* (2015.04); *H01M 10/6556* (2015.04); *H01M 10/6568* (2015.04); *H01M 50/209*

(2021.01); *H01M 50/224* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | |
|---|---|---|
| 6,255,015 B1 | 7/2001 | Corrigan et al. |
| 10,033,072 B2 | 7/2018 | Bhola et al. |
| 2020/0251698 A1 | 8/2020 | Paramasivam et al. |
| 2021/0167342 A1 | 6/2021 | Kwag |
| 2021/0226274 A1 | 7/2021 | Negrete et al. |

FOREIGN PATENT DOCUMENTS

| | | | | |
|---|---|---|---|---|
| CN | 105190934 A | 12/2015 | | |
| JP | 2022531359 A | * 7/2022 | .......... | H01M 50/264 |
| WO | WO-2024061586 A1 | * 3/2024 | .......... | H01M 10/654 |

* cited by examiner

*Primary Examiner* — Jonathan Crepeau
(74) *Attorney, Agent, or Firm* — David B. Kelley; Carlson, Gaskey & Olds, P.C.

(57) ABSTRACT

A traction battery pack assembly includes an array container, battery cells within the array container, and battery cell holders that each hold at least one of the battery cells. The battery cell holders partition an interior of the array container into a coolant section and a coolant-free section. A traction battery pack thermal management method includes, within an interior of an array container, using battery cell holders to hold battery cells, and additionally using the battery cell holders to partition the interior into a coolant section and a coolant-free section.

20 Claims, 4 Drawing Sheets

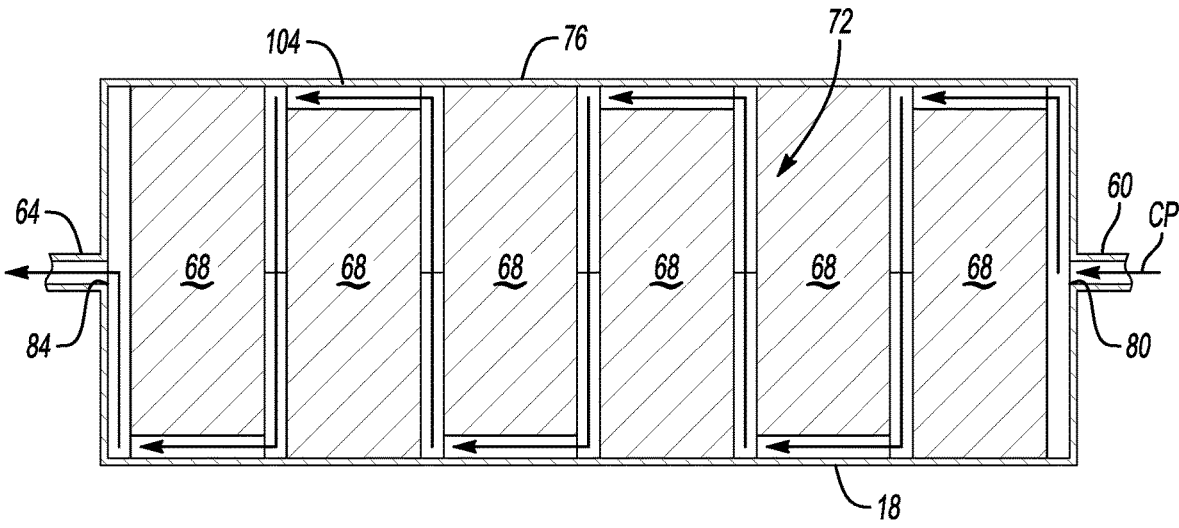
_Fig-5_
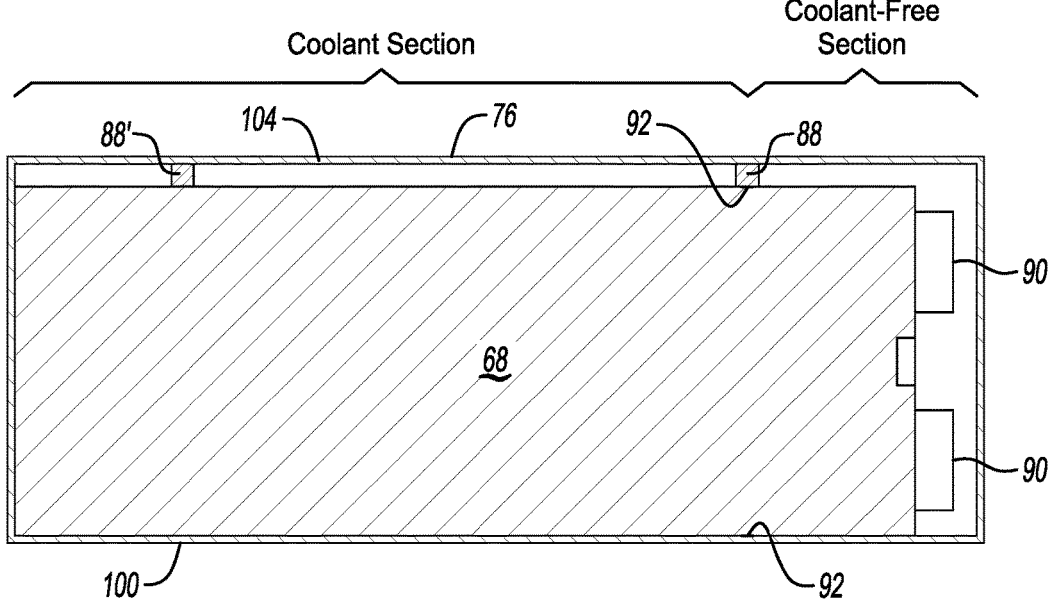
_Fig-6_

TRACTION BATTERY PACK HAVING BATTERY CELL HOLDERS THAT GUIDE COOLANT

TECHNICAL FIELD

This disclosure relates generally to a traction battery pack having battery cell holders that hold battery cells within an array and additionally guide coolant within the array.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to a traction battery pack assembly, including: an array container; a plurality of battery cells within the array container; and a plurality of battery cell holders that each hold at least one of the battery cells within the plurality of battery cells, the battery cell holders partitioning an interior of the array container into a coolant section and a coolant-free section.

In some aspects, the techniques described herein relate to an assembly, wherein the plurality of battery cell holders are directly attached to the array container.

In some aspects, the techniques described herein relate to an assembly, wherein the plurality of battery cell holders have a "U" shaped profile.

In some aspects, the techniques described herein relate to an assembly, wherein some of the plurality of battery cell holders open in a first direction and some of the plurality of battery cell holders open in an second direction that is opposite the first direction.

In some aspects, the techniques described herein relate to an assembly, wherein the plurality of battery cell holders that open in the first direction are attached to a first side of the array container, and the plurality of battery cell holders that open in the second direction are attached to an opposite, second side of the array container.

In some aspects, the techniques described herein relate to an assembly, wherein the first direction is vertically upward and the second direction is vertically downward.

In some aspects, the techniques described herein relate to an assembly, wherein each battery cell within the plurality of battery cells is supported by two battery cell holders within the plurality of battery cell holders, each of the two battery cell holders contacting at least two sides of the battery cell.

In some aspects, the techniques described herein relate to an assembly, wherein the coolant section includes a coolant path that is serpentine.

In some aspects, the techniques described herein relate to an assembly, wherein the plurality of battery cells are a plurality of prismatic battery cells.

In some aspects, the techniques described herein relate to an assembly, wherein the plurality of battery cells each have an outer case, wherein coolant in the coolant section is configured to directly contact the outer cases.

In some aspects, the techniques described herein relate to an assembly, wherein the outer case is an aluminum case.

In some aspects, the techniques described herein relate to an assembly, wherein the coolant is a liquid coolant.

In some aspects, the techniques described herein relate to an assembly, wherein the array container includes a coolant inlet and a coolant outlet.

In some aspects, the techniques described herein relate to an assembly, wherein a plurality of terminals of the battery cells are disposed in the coolant-free section of the array container.

In some aspects, the techniques described herein relate to a traction battery pack thermal management method, including: within an interior of an array container, using a plurality of battery cell holders to hold a plurality of battery cells; and using the plurality of battery cell holders to partition the interior into a coolant section and a coolant-free section.

In some aspects, the techniques described herein relate to a method, further including guiding a coolant through the coolant section to manage thermal energy.

In some aspects, the techniques described herein relate to a method, wherein the coolant is guided through the coolant section along a serpentine coolant path.

In some aspects, the techniques described herein relate to a method, wherein the coolant is a liquid coolant.

In some aspects, the techniques described herein relate to a method, wherein the plurality of battery cell holders each directly contact more than one side of a battery cell within the plurality of battery cells.

In some aspects, the techniques described herein relate to a method, wherein the plurality of battery cell holders hold the plurality of battery cells such that the plurality of battery cells alternate between being spaced from a first side of the array container and an opposite, second side of the array container.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 5 illustrates a section view taken at line 5-5.

FIG. 6 illustrates a section view taken line 6-6.

DETAILED DESCRIPTION

This disclosure details battery cell holders of battery array assemblies. The battery array assemblies each include battery cells held within an array container. The battery array assemblies include battery cell holders that hold battery cells and help to guide coolant through the battery arrays.

Figure 1:
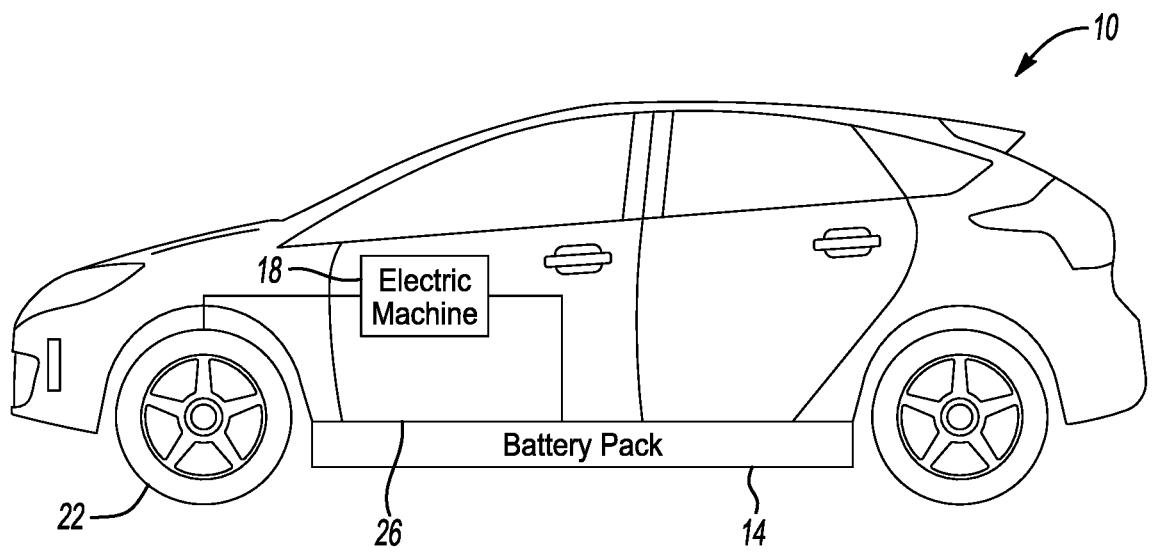
FIG. 1 illustrates a side view of an example electrified vehicle having a traction battery pack.
Figure 1:
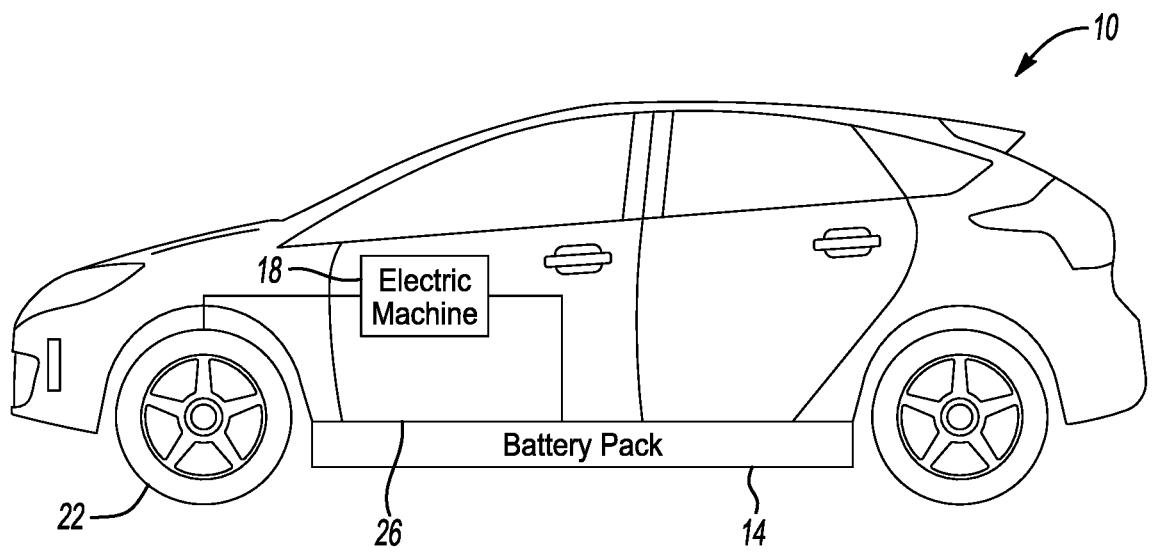

With reference to FIG. 1, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery.

The traction battery pack assembly 14 is, in the exemplary embodiment, secured to an underbody 26 of the electrified vehicle 10. The traction battery pack assembly 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
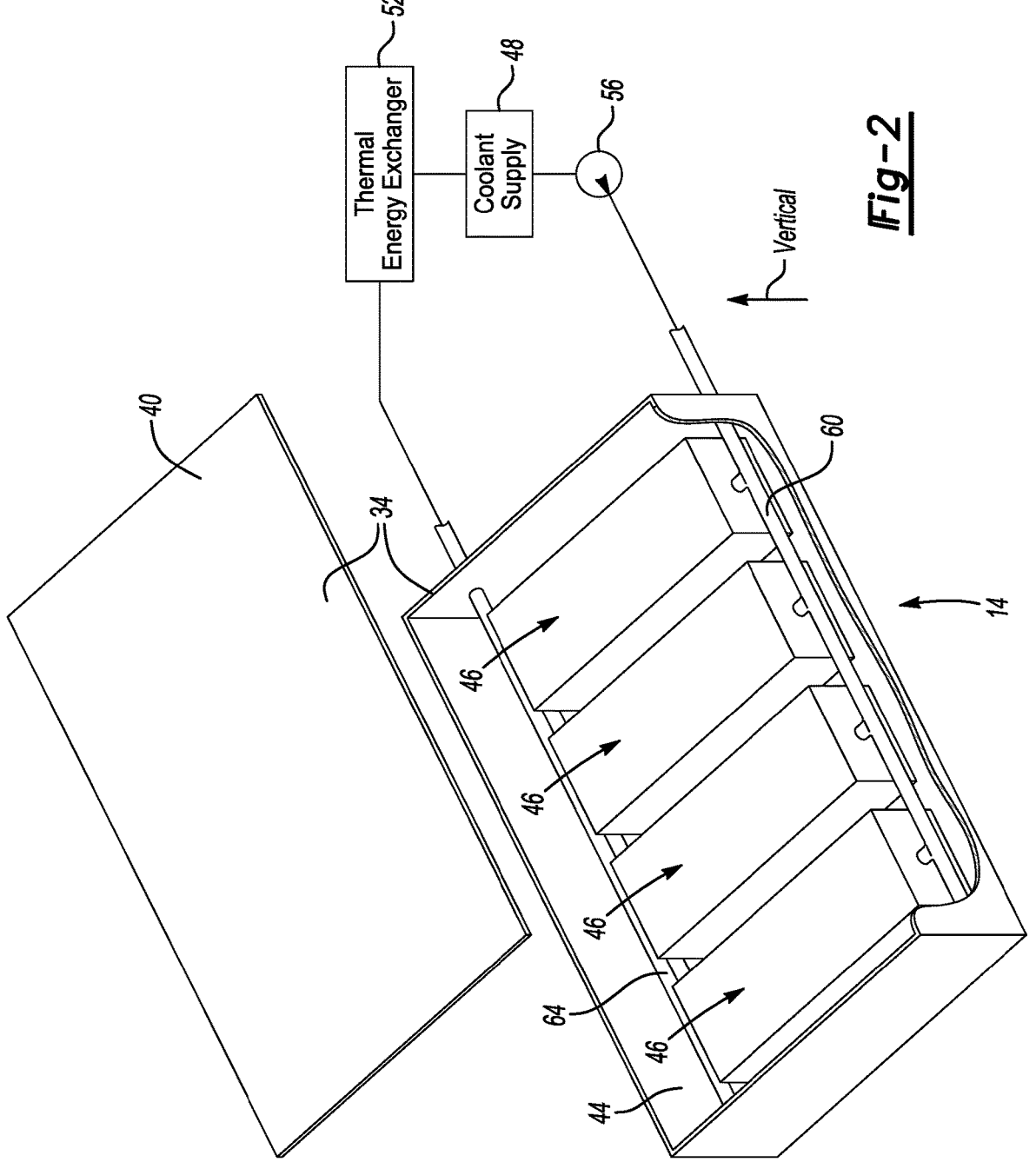
FIG. 2 illustrates a partially expanded, perspective view of the traction battery pack of FIG. 1.
Figure 3:
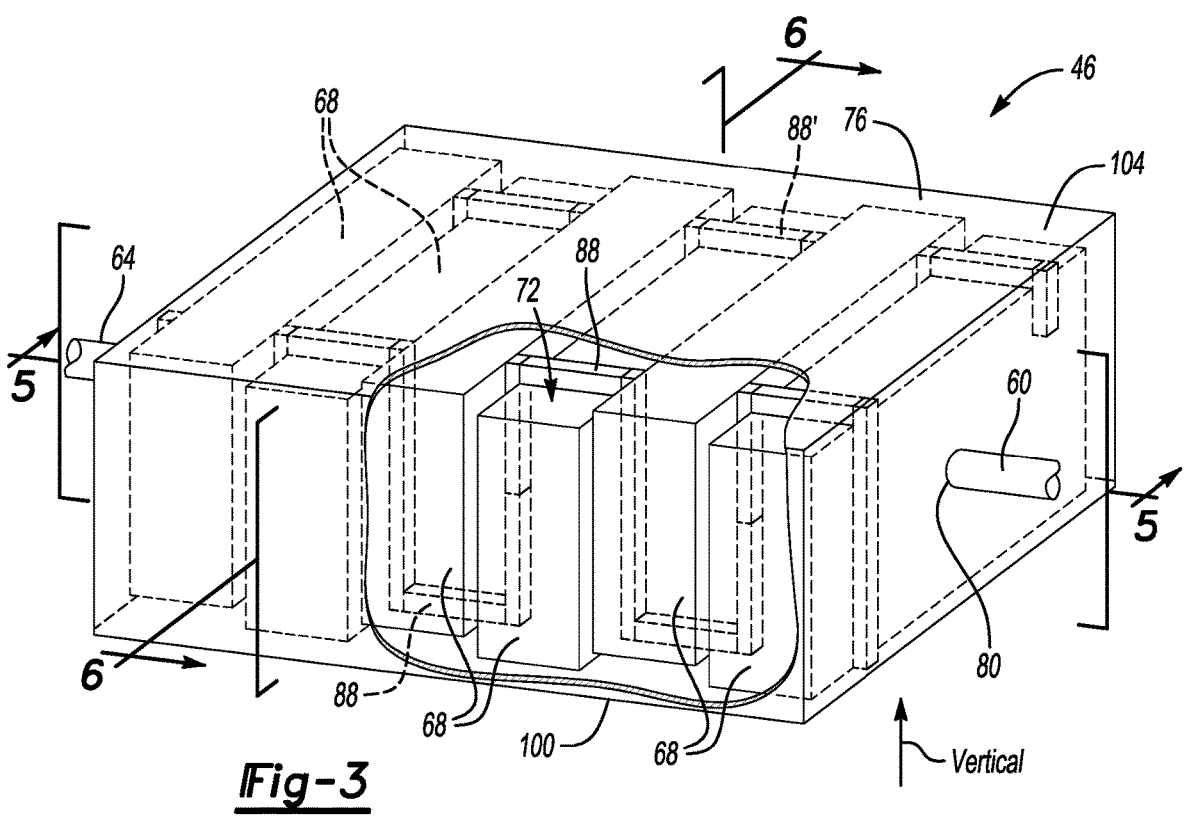
FIG. 3 illustrates a perspective view of a battery array from the traction battery pack of FIG. 2.
Figure 4:
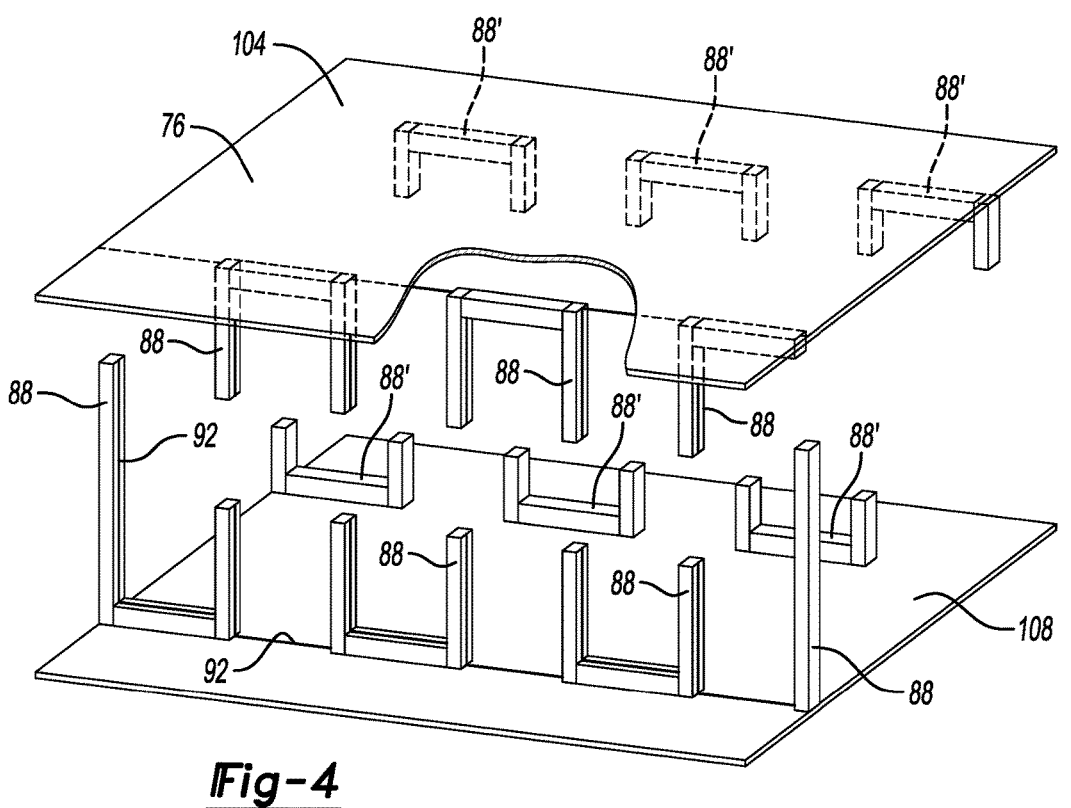
FIG. 4 illustrates a perspective view of battery cell holders secured to portions of an array container from the battery array of FIG. 3.

With reference now to FIG. 2, the traction battery pack assembly 14 includes an enclosure assembly 34 housing a plurality of battery arrays 46. In the exemplary embodiment, the enclosure assembly 34 includes an enclosure cover 40 and an enclosure tray 44. When the enclosure assembly 34 is assembled, the enclosure cover 40 is secured to the enclosure tray 44.

In this example, four of the battery arrays 46 are housed within the enclosure assembly 34. Other numbers of battery arrays 46 could be housed within the enclosure assembly 34 in other examples. That is, the enclosure assembly 34 could house more than four battery arrays 46 or fewer than four battery arrays 46.

A coolant supply 48 and a thermal energy exchanger 52 are outside the enclosure assembly 34. A pump 56 can be used to move coolant from the coolant supply 48 into the enclosure assembly 34, through an inlet manifold 60. The inlet manifold 60 delivers the coolant to each of the battery arrays 46. The coolant circulates through the battery arrays 46 to manage thermal energy levels. The coolant can, for example, take on thermal energy to cool the battery arrays 46.

The coolant moves from battery arrays 46 to an outlet manifold 64, which communicates the coolant to the thermal energy exchanger 52. Thermal energy can transfer from the coolant to ambient at the thermal energy exchanger 52. The coolant can move from the thermal energy exchanger 52 back to the coolant supply.

With reference now to FIGS. 3-6, each of the battery arrays 46 includes a plurality of battery cells 68 held within an interior 72 of an array container 76. A coolant inlet 80 and a coolant outlet 84 extend through the array container 76. The array containers 76 are sealed other than the coolant inlet 80 and coolant outlet 84. Due to the array container 76, the battery arrays 46 can be considered contained battery arrays 46.

The coolant inlet 80 receives coolant from the inlet manifold 60. The coolant outlet 84 passes the coolant from the array container 76 to the outlet manifold 64. Coolant enters the array containers 76 through the coolant inlet 80 and exits the array container 76 through the coolant outlet 84. The coolant is a liquid coolant in this example. In another example, the coolant is air.

The battery arrays 46 include a plurality of battery cell holders 88 that hold the battery cells 68 within the array containers 76. Notably, the battery cell holders 88 also partition the interior 72 of the array container 76 into a coolant section and a coolant-free section. The coolant section is fluidly isolated from the coolant-free section. If keeping components of the battery arrays 46 away from coolant is desired, those components can be positioned within the coolant-free section. In this example, terminals 90 of the battery cells 68 are positioned within the coolant-free section and kept away from coolant (FIG. 6).

Within the battery arrays 46, the coolant section establishes a coolant path CP that extends from the coolant inlet 80 to the coolant outlet 84. Coolant moved along the coolant path CP helps to manage thermal energy levels of the battery cells 68 and other components.

The battery arrays 46 can include seals 92 where the battery cell holders 88 interface with other components. The seals 92 help to block fluid flow from the coolant section to the coolant free section. In this example, seals 92 are positioned where some of the battery cell holders 88 interface with the battery cells 68, with the array containers 76, and with other battery cell holders 88. Interfaces having the seals 92 can be considered sealed interfaces.

Some of the battery cell holders 88' are not relied on to separate a coolant section from a coolant-free section. These battery cell holders 88' do not include seals 92.

In this example, the battery cells 68 each have an outer case 96. The outer cases 96 can be a metal or metal alloy. In this example, the outer cases 96 are aluminum.

Boundaries of some sections of the coolant path CP are at least partially established by portions of the outer cases 96. Coolant communicated through the coolant path CP directly contacts the outer cases 96, which can facilitate thermal energy transfer from the battery cells 68 to the coolant moving along the coolant path CP.

In this example, the plurality of battery cell holders 88 are directly attached to the array container 76. Some of the battery cell holders 88 have a "U" shaped profile.

Some of the battery cell holders 88 are attached to a floor 100 of the array container 76 and open in a first direction, which is vertically upward in this example. Some of the plurality of battery cell holders 88 are attached to a cover 104 of the array container 76 and open vertically downward in an second direction that is opposite the first direction. Vertical, for purposes of this disclosure is with reference to ground and a general orientation of the electrified vehicle 10 (FIG. 1) during operation.

The battery cell holders 88 attached to the floor 100 on a first side of the array container 76 hold respective battery cells 68 away from the floor 100. Coolant can move between these battery cells 68 and the floor 100 when moving along the coolant path. In this example, the battery cell holders 88 attached to the floor 100 are arranged to hold every other battery cell 68 (i.e., alternating battery cells) in a position spaced from the floor 100.

The battery cell holders 88 attached to the cover 104 on a second, opposite side of the array container 76 hold respective battery cells 68 away from the cover 104. Coolant can move between these battery cells 68 and the cover 104 when moving along the coolant path CP. In this example, the battery cell holders 88 attached to the cover 104 are arranged to hold every other battery cell 68 (i.e., alternating battery cells) in a position spaced from the cover 104.

As the battery cells 68 alternate between being spaced from the floor 100 or the cover 104, the coolant path CP follows a serpentine route through the contained battery array 46.

In this example, each battery cell 68 within the plurality of battery cells 68 is supported by two battery cell holders 88. Other examples could include supporting the battery cells 68 with another number of battery cell holders 88, such as one battery cell holder 88 or more than two battery cell holders 88.

In an embodiment, the battery cells 68 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The battery arrays 46, in the exemplary embodiment, each include six individual battery cells 68, but more than six or fewer than six battery cells 68 could be included in other examples. For example, the battery arrays 46 could include forty individual battery cells 68 in another example.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery pack assembly, comprising:
an array container;
a plurality of battery cells within the array container; and
a plurality of battery cell holders that each hold at least one of the battery cells within the plurality of battery cells, the battery cell holders partitioning an interior of the array container into a coolant section and a coolant-free section, wherein the plurality of battery cells each have an outer case, wherein coolant in the coolant section is configured to directly contact the outer cases.

2. The assembly of claim 1, wherein the plurality of battery cell holders are directly attached to the array container.

3. The assembly of claim 1, wherein the plurality of battery cell holders have a "U" shaped profile.

4. The assembly of claim 1, wherein some of the plurality of battery cell holders open in a first direction and some of the plurality of battery cell holders open in a second direction that is opposite the first direction.

5. The assembly of claim 4, wherein the plurality of battery cell holders that open in the first direction are attached to a first side of the array container, and the plurality of battery cell holders that open in the second direction are attached to an opposite, second side of the array container.

6. The assembly of claim 4, wherein the first direction is vertically upward and the second direction is vertically downward.

7. The assembly of claim 1, wherein each battery cell within the plurality of battery cells is supported by two battery cell holders within the plurality of battery cell holders, each of the two battery cell holders contacting at least two sides of the battery cell.

8. The assembly of claim 1, wherein the coolant section includes a coolant path that is serpentine.

9. The assembly of claim 1, wherein the plurality of battery cells are a plurality of prismatic battery cells.

10. The assembly of claim 1, wherein the outer case is an aluminum case.

11. The assembly of claim 1, wherein the coolant is a liquid coolant.

12. The assembly of claim 1, wherein the array container includes a coolant inlet and a coolant outlet.

13. The assembly of claim 1, wherein a plurality of terminals of the battery cells are disposed in the coolant-free section of the array container.

14. A traction battery pack thermal management method, comprising:
within an interior of an array container, using a plurality of battery cell holders to hold a plurality of battery cells; and
using the plurality of battery cell holders to partition the interior into a coolant section and a coolant-free section, wherein coolant in the coolant section directly contacts outer cases of the plurality of battery cells.

15. The method of claim 14, further comprising guiding the coolant through the coolant section to manage thermal energy.

16. The method of claim 14, wherein the coolant is guided through the coolant section along a serpentine coolant path.

17. The method of claim 14, wherein the coolant is a liquid coolant.

18. The method of claim 14, wherein the plurality of battery cell holders each directly contact more than one side of a battery cell within the plurality of battery cells.

19. The method of claim 14, wherein the plurality of battery cell holders hold the plurality of battery cells such that the plurality of battery cells alternate between being spaced from a first side of the array container and an opposite, second side of the array container.

20. A traction battery pack assembly, comprising:
an array container;
a plurality of battery cells; and
a plurality of battery cell holders that hold the plurality of battery cells, the plurality of battery cell holders partitioning an interior of the array container into a coolant section and a coolant-free section, in the coolant section, the plurality of battery cells are at least partially immersed within a liquid coolant that directly contacts outer surfaces of the plurality of battery cells.

* * * * *